(12) United States Patent
Eisenbeis

(10) Patent No.: US 9,337,650 B2
(45) Date of Patent: May 10, 2016

(54) CURRENT LOOP INPUT PROTECTION

(71) Applicant: FISHER CONTROLS INTERNATIONAL LLC, Marshalltown, IA (US)

(72) Inventor: Clyde T. Eisenbeis, Marshalltown, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 231 days.

(21) Appl. No.: 14/012,468

(22) Filed: Aug. 28, 2013

(65) Prior Publication Data

US 2015/0061634 A1  Mar. 5, 2015

(51) Int. Cl.
*H02H 9/04* (2006.01)
*H02J 3/00* (2006.01)
*H02J 9/00* (2006.01)

(52) U.S. Cl.
CPC ........ *H02H 9/04* (2013.01); *H02J 3/006* (2013.01); *H02J 9/00* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,805,062 A * | 9/1998 | Pearlman | ................ | H03F 3/085 340/508 |
| 6,933,771 B2 * | 8/2005 | Stearns | ................... | G05F 3/205 327/514 |
| 6,972,584 B1 * | 12/2005 | Ferreira | ........................... | 73/627 |
| 7,072,159 B2 * | 7/2006 | Mercier | .......................... | 361/58 |
| 7,280,048 B2 * | 10/2007 | Longsdorf et al. | ............ | 340/664 |
| 7,479,787 B2 * | 1/2009 | Lyon | ............................. | 324/644 |
| 7,835,125 B2 * | 11/2010 | Freiburger | ......... | G05B 19/0425 361/93.1 |
| 2008/0079419 A1 * | 4/2008 | Lyon | ......................... | 324/158.1 |
| 2013/0107919 A1 * | 5/2013 | Burns | ..................... | H04L 27/10 375/219 |

OTHER PUBLICATIONS

International Search Report and Written Opinion issued in PCT/US2014/053088 mailed on Jan. 13, 2015.
Anonymous, "4-20mA Current Loop Primer—DMS-AN-20", pp. 1-3 (2011).
Commy, "Instrumentation", pp. 1-5 (2012).
Ross, D., "Design FET-OT line switch between main power source and back up supply", Electronic Design Technology Development Application and New Products (2012).
Windell, "Basics: Introduction to Zener Diodes", Evil Mad Scientist (2012).

* cited by examiner

*Primary Examiner* — Thienvu Tran
*Assistant Examiner* — Angela Brooks
(74) *Attorney, Agent, or Firm* — Marshall, Gerstein & Borun LLP

(57) ABSTRACT

A protective circuit for a process control device such as a valve actuator, for example, prevents damage to device components. In particular, a protective circuit allows an analog current loop (e.g., 4-20 mA) to provide to a device component a secondary operating voltage, derived from the analog current loop, in the absence of a primary operating voltage source (e.g., during a power failure), such that the device component is not damaged when a signal from the analog current loop is applied to the process control device in the absence of the primary operating voltage source.

15 Claims, 5 Drawing Sheets

CURRENT LOOP INPUT PROTECTION

FIELD OF THE DISCLOSURE

The present disclosure is directed to process control device circuitry and, more particularly, to an input protection circuit for devices controlled or signaled via analog current loops.

BACKGROUND

Analog current loops, such as 4-20 mA current loops or older 10-50 mA current loops, are commonly used to transmit signals (e.g., measured sensor values, control values, etc.) to process control devices, such as actuator valves, motor speed controls, panel meters, etc. In a typical scenario, a sensor or controller provides an output voltage representing an indicated value such as a measured value (e.g., temperature, pressure, etc.) or setpoint, respectively, and a transmitter converts the output voltage to a proportional 4-20 mA current in a closed current loop. Subsequently, a process control device receives the 4-20 mA current signal and processes the signal via an internal resistance, which can be easily measured by an analog input of the process control device.

Some process control devices that receive signals from current loops rely on power from the current loop itself, but other devices receive power from separate operating sources. In the past, process control devices, such as field instruments located on remote oil or gas structures, relied on pneumatic power. In such cases, the instruments could operate with only a small current source (4-20 mA) for signaling purposes, while other components of the instruments were pneumatically powered.

In recent years, however, a large number of field instruments or process control devices rely on an operating electric power source separate from a 4-20 mA current loop. For example, some valve actuators rely on a voltage input, such as +10V and −10V, to operate, even though the actuators receive control signals via a 4-20 mA current loop. As such, a situation can arise in which a 4-20 mA current is applied to an instrument while certain components are not powered by the corresponding operating voltage source, such as during a power failure. This situation often results in damage to sensitive electronic components (e.g., integrated circuits).

SUMMARY

A protective circuit for protecting a component of the process control device includes a current loop input operable to receive a current proportional to an indicated value and an operating voltage input configured to couple to a voltage source and to receive from the voltage source a primary voltage signal, the operating voltage input further operable to power the component such that the process control device operates to control a process according to the indicated value. The protective circuit further includes a plurality of protective circuit components configured to provide a secondary voltage signal to the component from the current loop input when the primary voltage signal is below a first threshold, and provide the primary voltage signal to the component from the operating voltage input when the primary voltage signal is above the first threshold.

A process control device includes an integrated circuit component, an operating voltage source coupled to a voltage input of the integrated circuit component, and a protective circuit with a current loop input. The protective circuit is configured to provide a secondary voltage signal to the component from the current loop input when the primary voltage signal is below a first threshold, and provide a primary voltage signal to the component from the operating voltage source when the primary voltage signal is above the first threshold.

DETAILED DESCRIPTION

The present disclosure is directed to a protective circuit for a process control device such as a valve actuator, for example, and, specifically, to preventing damage to device components via the protective circuit. In particular, a protective circuit according to the present disclosure allows an analog current loop (e.g., 4-20 mA) to power a process control device in the absence of an operating voltage source (e.g., during a power failure), such that components of the process control device are not damaged when a signal from the analog current loop is applied to the unpowered process control device.

Figure 1:
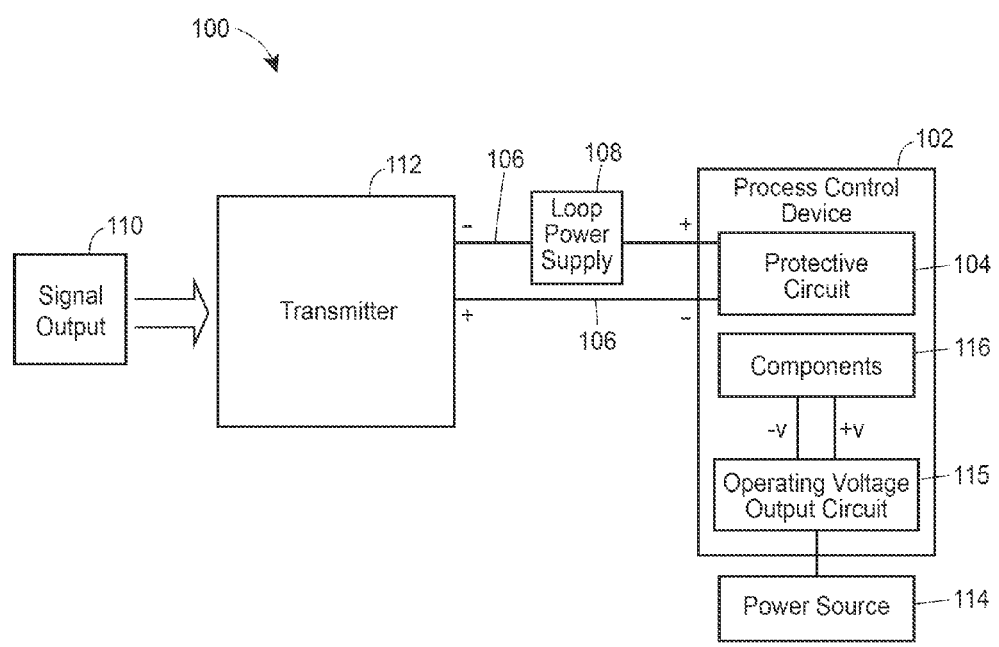
FIG. 1 illustrates an example system in which a protective circuit allows a current loop to power components of a process control device.

Referring now to FIG. 1, an example system 100 constructed in accordance with one version of the present disclosure includes a process control device 102 with a protective circuit 104. By way of example, the process control device 102 may include an electric control valve, an actuator, a motor, a proportional-integral-derivative (PID) controller, a cascade controller, etc., and the process control device 102 may be part of a manufacturing plant, oil or gas extraction structure, refinery, HVAC (heating, ventilation, and air conditioning) system, etc.

The process control device 102 receives control signals via a current loop 106, such as a 4-20 mA current loop powered by a loop power supply 108, for example. In an implementation, a signal output device 110, such as a sensor (e.g., thermometer, pressure sensor, speedometer, etc.) or controller, outputs a voltage proportional to an indicated value such as a measured value (e.g., a temperature, pressure, speed, etc.) or setpoint, respectively. The signal output device 110 outputs the voltage to a transmitter 112, and, in turn, the transmitter 112 converts and/or amplifies the voltage from the signal output device 110 to a proportional current signal in the current loop 106. Upon measuring the current loop signal (e.g., via a measurement of voltage across an internal resistance), the process control device 102 may trigger device functions, execute suitable control logic, etc., in the implementation. A loop power supply 108 supplies power to the circuit.

Although illustrated in FIG. 1 as separate components, the transmitter 112, loop power supply 108, and/or signal output device 110 may, in some cases, be internal components of a process control device or instrumentation device. For example, the signal output device 110 of a process controller may include computer-readable instructions implementing control logic that, when executed by a processor, outputs a digital control signal or setpoint to the transmitter 112. In such a case, the signal output device 110 and/or the transmitter 112 may include an analog to digital converter (not shown) to convert a digital control signal to a voltage.

The transmitter 112 may use a 4 mA signal in the current loop to indicate a measurement of zero, or a calibrated value of zero, from the signal output device 110 and a 20 mA signal in the current loop to indicate a maximum, or full-scale, measurement from the signal output device 110, for example. In addition, the transmitter 112 itself may be powered by the loop power supply 108, and, thus, may be configured to operate on less than 4 mA of current, which may represent the zero measurement of the signal output device 110, in an implementation.

The loop power supply 108 may be a direct current (DC) power supply such that the magnitude of the current is proportional to output from the signal output device 110, in an implementation. In some implementations, the power supply 108 may be set to operate at a level that is greater than the voltage drop in the wires of the current loop 106 plus the voltage drop across the process control device 102 and voltage required to operate the transmitter 112.

Although the process control device 102 is signaled or controlled via the current loop 106, the process control device 102 is powered by a power source 114. The power source 114 provides power to the various components 116, including to some circuits or components (e.g., operating voltage output circuit 115) that provide operating voltages for other circuits or components. For example, the power source 114 may provide power to a regulator, which may output positive and negative voltages that are, in turn, applied to the rails of an integrated circuit device. The positive and negative voltages are denoted in FIG. 1 as +V and −V, respectively, as this voltage may vary from device to device (e.g., from IC to IC and/or from process control device to process control device), in an implementation. For example, a motor within the process control device 102 may be triggered or controlled via a signal in the current loop 106 while receiving power to operate from the power source 114. The power source 114 may include a power supply coupled to mains power, for example, where the mains power is input to the process control device 102 via an alternating current (AC) adapter, or the operating voltage source 114 may include a power supply coupled to battery power source (in which case it may be disposed inside the process control device 102). The power source 114 may, in some cases, be electrically coupled to an operating voltage output circuit 115, such as a power supply or regulator circuit, that may transform a mains or other voltage signal (e.g., 120V) to particular voltages (e.g., ±3.3V, ±10V), where the particular voltages can be applied across corresponding pins or inputs of components such as ICs. In some implementations, the power source 114 is separate from the loop power supply 108 such that a power failure in one of the power source 114 and loop power supply 108 does not imply a power failure in the other.

In some scenarios, the process control device 102 may receive a signal via the current loop 106 when the process control device 102 is not being powered by the power source 114 or, at least, when a component that normally receives a primary voltage signal from the operating voltage output circuit 115 is not receiving the primary voltage signal. For example, the power source 114 may be subject to a plant power failure, or the power source 114 may be an internal battery power source drained of power. Alternatively, one or more components in the operating voltage output circuit 115, such as a regulator, may experience a failure. In such a scenario, the protective circuit 104 prevents damage to one or more components 116, such as integrated circuits (ICs) or instrumentation amplifiers, by temporarily providing to the one or more components 116 a secondary voltage signal, from the current loop 106, across the pins or inputs that are configured to receive the primary voltage signal. In such a way, the components 116 are able to accept input from the current loop 106 without damage, even in the absence of a voltage signal from the operating voltage output circuit 115 (e.g., when the voltage signal from the operating voltage output circuit 115 is below a threshold). For example, a current loop 106 can supply a voltage across the power rails of an IC such that the IC is powered when it receives control signals (e.g., from the current loop 106) across other pins of the IC. Further details of example protective circuits are described with reference to FIG. 2 and FIG. 3.

Although the example system 100 includes one process control device 102, one current loop 106, and one protective circuit 104, a transmitter may transmit control signals to any number of process control devices with any number of protective circuits. For example, a process control device may contain multiple components each protected by a separate protective circuit. Alternatively, one protective circuit may protect multiple components in a process control device via a bus connection to the multiple components, which distributes a current loop signal to the multiple components.

In addition, although the example current loop 106 is illustrated as a two-wire, or "Type 2" current loop, current loops of the present disclosure may be of any suitable type. For example, a current loop may be a three-wire current loop, where a transmitter, process control device, and power supply share a ground connection and a third wire connects to operating voltage, or a current loop may be a four-wire current loop which may be powered via AC.

Figure 2:
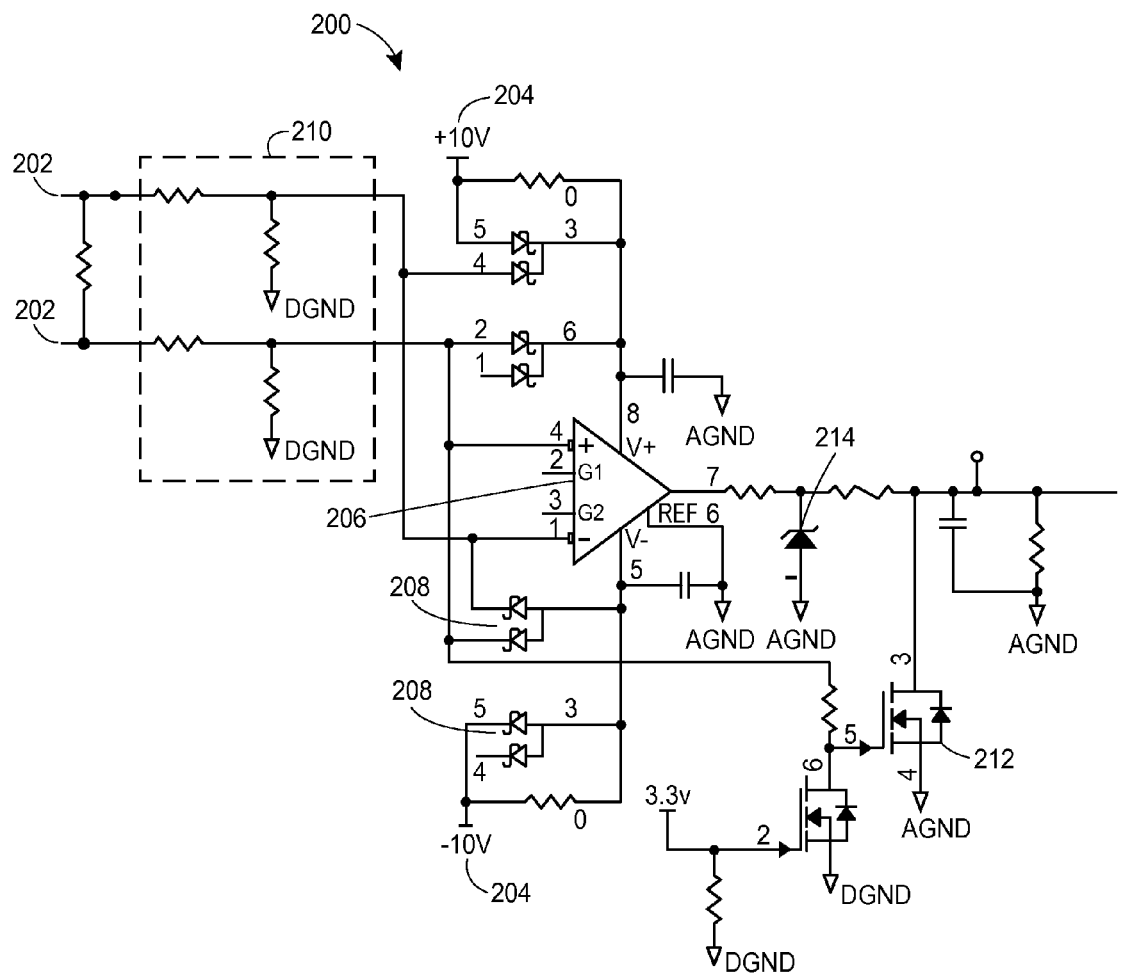
FIG. 2 is a circuit diagram of an example device circuit with a protective circuit that can be implemented in the process control device illustrated in FIG. 1.

FIG. 2 is a circuit diagram of an example device circuit 200 including a protective circuit to prevent damage to device components. The device circuit 200 may be implemented in the process control device 102, for example.

The device circuit 200 includes an input 202 from a current loop (e.g., 4-20 mA) and operating voltage inputs 204 from an operating voltage source (e.g., from the operating voltage output circuit 115). In an implementation, the operating voltage inputs 204 may receive an operating voltage for one or more process control device components, and the input 202 from the current loop may receive control signals (e.g., proportional to a sensor output or a setpoint) at the process control device. Components receiving voltages from the operating voltage inputs 204 may include, for example, an instrumentation amp 206. Although, the instrumentation amp 206 will be used as an example component with reference to FIG. 2, any suitable process control device components may receive a primary operating voltage from the operating voltage inputs 204 and may be protected by a protective circuit, including other ICs, printed circuit boards (PCBs), potentiometers, resistors, capacitors, microelectromechanical systems (MEMS), etc.

In certain scenarios, a transmitter, such as transmitter 112, may send current through a current loop to the current loop input 202 when the instrumentation amp 206 is not receiving an operating voltage at the operating voltage inputs 204 (e.g., when the voltages at the operating voltage inputs 204 are below a threshold, such as at 0 V). In such a case, the protective circuit 104 of the device circuit 200, which may include one or more diodes 208, for example, allows the instrumentation amp 206 (i.e., a component of the process control device) to receive a secondary operating voltage derived from the current received via the loop input 202. Thus, the instrumentation amp 206 temporarily receives the secondary operating voltage when the primary operating voltage received at the operating voltage inputs 204 is below the predetermined threshold. In this way, the instrumentation amp 206 does not receive a signal via the current loop input 202 at the same time that the instrumentation amp 206 is not receiving an operating voltage; the secondary operating voltage acts to protect the instrumentation amp 206 from associated damage.

The diodes 208 of the protective circuit 104 may be any suitable diodes with a low forward voltage drop, such as Schottky diodes, for example. Although the example protective circuit includes eight diodes 208, any suitable number and type of diodes may be used to allow a current loop to temporarily provide the secondary operating voltage to the process control device components.

In another scenario, an operating voltage is applied to the example device circuit 200 via the operating voltage inputs 204. In such a case, the instrumentation amp 206 may receive the primary operating voltage via the operating voltage inputs 204, rather than receiving the secondary operating voltage derived from the current provided at the current loop input 202. Thus, the protective circuit 104 allows process control device components to receive a secondary or redundant operating voltage derived from the current loop in the absence of the primary voltage source, while allowing the primary voltage source to power the components when such a source is available.

In addition to the protective circuit components already mentioned (the diodes 208), the protective circuit of the device circuit 200 may include a voltage divider section 210 at the input 202 of the current loop. The voltage divider section 210 allows the device circuit 200 to accept current loop signals from transmitters or power supplies operating at any voltage such as 12V, 15V, 14V, or 36V DC, for example. Some transmitters may operate at voltages higher than the voltage of a particular corresponding operating voltage input 204. Thus, to protect the instrumentation amp 206, or other process control device components, the voltage divider section 210 divides the voltage across the current loop input 202 such that the voltage across the current loop input 202 can be applied to power the instrumentation amplifier 206 in the absence of the primary operating voltage at the inputs 204. For example, the voltage divider section 210 may be designed such that the voltage applied to the protected component(s) (e.g., to the instrumentation amplifier 206) does not exceed the voltage specified for the operating voltage inputs 204. If the process control device is configured to receive 36V across the current loop input 202 and the instrumentation amplifier 206 has a 10V voltage rail, for example, the voltage divider section 210 may divide the input by a factor of four such that a 9V input can be applied to the voltage rails of the instrumentation amplifier 206. The voltage divider section 210 may include resistors arranged in a manner to divide voltage, as known in the industry. In some implementations, the voltage divider section 210 may include 0.1% resistors for improved noise cancellation, and/or the voltage divider section 210 may include one or more capacitors 211 to provide filtering.

Still further, the device circuit 200 may include a field-effect transistor (FET) 212 and an output diode 214, in an implementation. The FET "clamps" the output of the device circuit 200 such that the output does not go to a positive voltage in the absence of an applied voltage from power input 204, and the output diode 214 keeps the output of the device circuit 200 from going to a negative voltage greater than a voltage drop across a diode.

Figure 3:
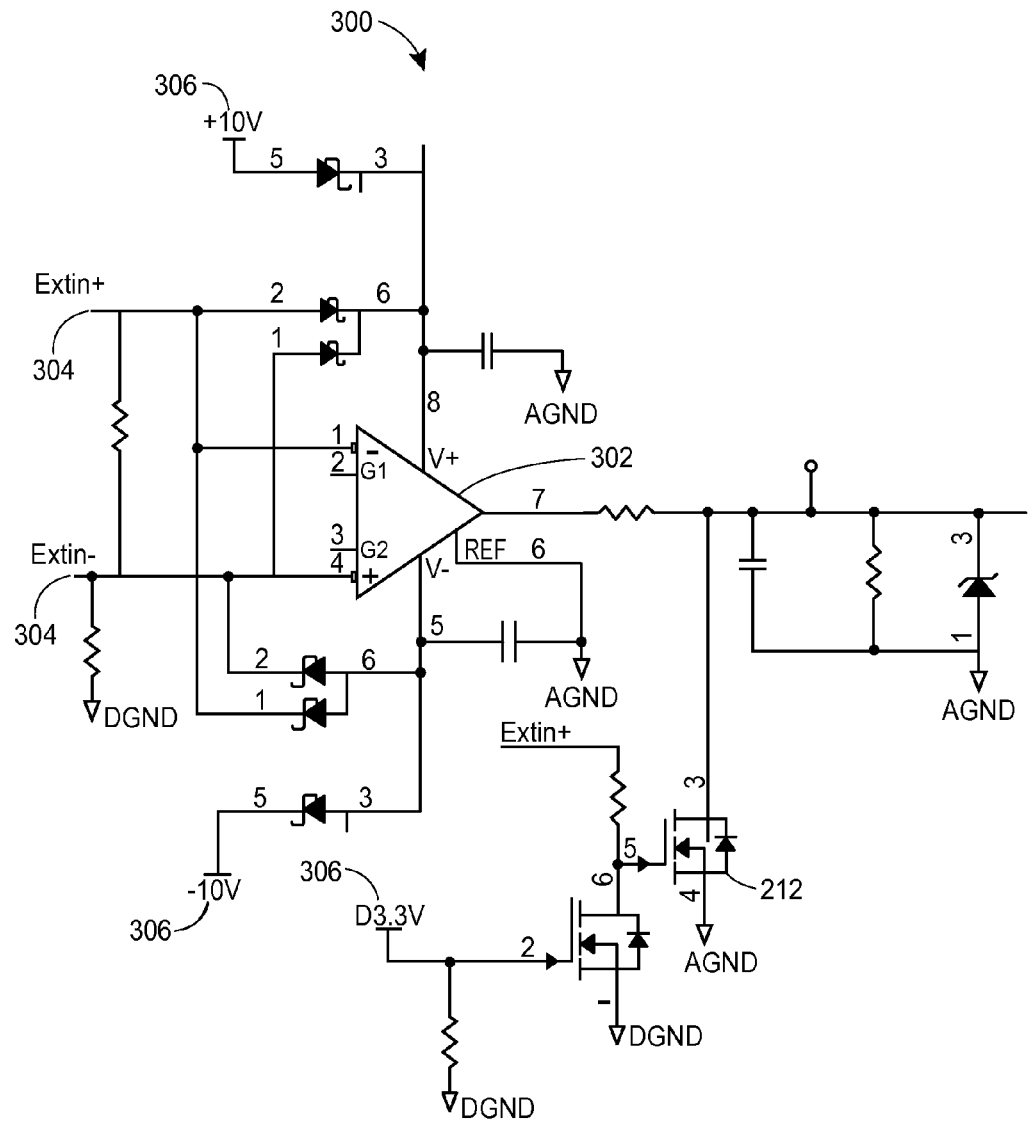
FIG. 3 is a circuit diagram of another example device circuit with a protective circuit that can be implemented in the process control device illustrated in FIG. 1.

FIG. 3 is a circuit diagram depicting another example device circuit 300 including a protective circuit to prevent damage to device components. The protective circuit of the device circuit 300 includes fewer diodes, as compared with example device circuit 200, and does not include a voltage divider section. However, the protective circuit of the device circuit 300 still allows a device component 302 to receive a secondary operating voltage derived from current at a current loop input 304 in the absence of a primary operating voltage.

Figure 4:
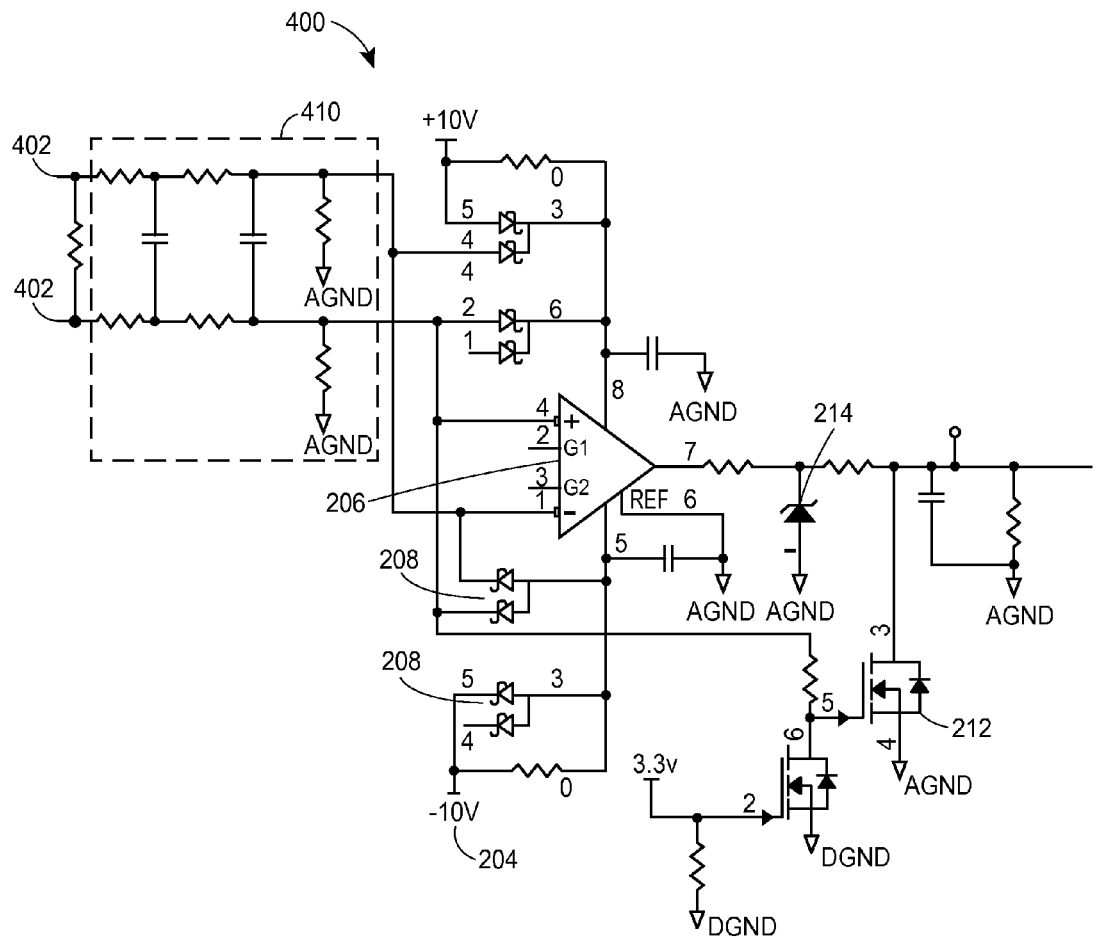
FIG. 4 is a circuit diagram of still another example device circuit with a protective circuit that can be implemented in the process control device illustrated in FIG. 1.
Figure 5:
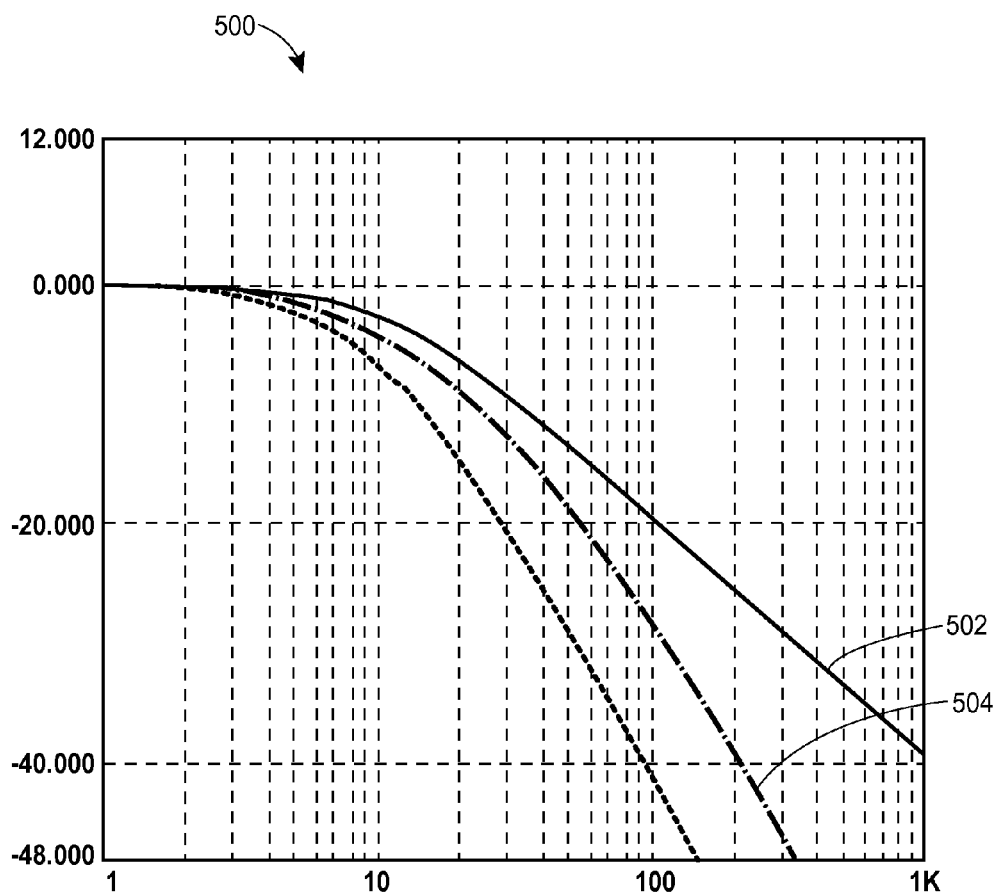
FIG. 5 is a graph depicting a characteristic associated with the filter implemented in the example device circuit of FIG. 4.

FIG. 4 depicts still another example device circuit 400. The device circuit 400, like the device circuit 200 depicted in FIG. 2, includes a voltage divider section 410. In the voltage divider section 410 a cascaded single-pole filter is implemented, which serves to provide noise cancellation and filtering. The resistors R40 and R41 in the voltage divider circuit 210 of FIG. 2, are split in the voltage divider section 410 into two, series-connected resistors each, R40/R42 and R41/R43, respectively. Parallel capacitors C50 and C51 are included and configured to create cascaded RC filters. In some implementations, the voltage divider section 410 may include 0.1% resistors for improved noise cancellation. FIG. 5 is a graph depicting a response characteristic associated with the filter implemented in the example device circuit 400 of FIG. 4. A trace 502 represents the response of a single-pole filter. A trace 504 corresponds to the response of the cascaded filter implemented in the device circuit 400 in FIG. 4.

What is claimed is:

1. A protective circuit in a process control device for protecting a component of the process control device, the protective circuit comprising:
    a current loop input operable to receive a current proportional to an indicated value;
    an operating voltage input, separate from the current loop input, configured to couple to a voltage source and to receive from the voltage source a primary voltage signal, the operating voltage input further operable to power the component such that the process control device operates to control a process according to the indicated value; and
    a plurality of protective circuit components configured to:
        provide a secondary voltage signal to the component from the current loop input when the primary voltage signal is below a first threshold, and
        provide the primary voltage signal to the component from the operating voltage input when the primary voltage signal is above the first threshold.

2. The protective circuit of claim 1, further comprising a voltage divider configured to divide the voltage across the leads of the current loop input by a pre-determined factor.

3. The protective circuit of claim 1, wherein the plurality of protective circuit components is further configured to:
    clamp an output of the process control device such that the output does not reach a positive voltage when the operating voltage input is below the first threshold; and
    prevent the output from reaching a negative voltage greater than a second threshold.

4. The protective circuit of claim 3, wherein the second threshold is a voltage drop across a diode.

5. The protective circuit of claim 1, wherein the current loop input receives a 4-20 mA current loop signal and is configured to provide the process control device with current values proportional to the indicated value.

6. The protective circuit of claim 5, wherein the indicated value represents a sensor output.

7. The protective circuit of claim 5, wherein the indicated value is a setpoint from a controller.

8. The protective circuit of claim 1, wherein the component includes an integrated circuit.

9. The protective circuit of claim 1, wherein the component includes a plurality of components.

10. The protective circuit of claim 8, wherein the plurality of protective circuit components includes a bus configured to distribute power from the current loop input to the plurality of components.

11. A process control device comprising:
an integrated circuit component;
an operating voltage source coupled to a voltage input of the integrated circuit component to provide a primary voltage signal to the integrated circuit component;
a protective circuit including a current loop input, separate from the voltage input, the protective circuit configured to:
provide a secondary voltage signal to the component from the current loop input when the primary voltage signal is below a first threshold, and
provide the primary voltage signal to the component from the operating voltage source when the primary voltage signal is above the first threshold.

12. The process control device of claim 11, further comprising a voltage divider configured to divide the voltage across the leads of the current loop input by a pre-determined factor such that the resulting voltage can be applied to the integrated circuit component without damaging the integrated circuit component.

13. The process control device of claim 11, wherein the current loop input receives a 4-20 mA current loop signal and is configured to provide the process control device with current values proportional to an indicated value.

14. The process control device of claim 13, wherein the indicated value represents a sensor output.

15. The process control device of claim 13, wherein the indicated value is a setpoint value from a controller.

* * * * *